United States Patent
Zhou et al.

(10) Patent No.: US 12,314,539 B2
(45) Date of Patent: *May 27, 2025

(54) PAGE NAVIGATION METHOD AND ELECTRONIC DEVICE

(71) Applicant: Samsung Electronics Co., Ltd., Suwon-si (KR)

(72) Inventors: Zhishun Zhou, Nanjing (CN); Shurong Chen, Nanjing (CN); Yan Wang, Nanjing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/750,324

(22) Filed: Jun. 21, 2024

(65) Prior Publication Data

US 2024/0338109 A1  Oct. 10, 2024

Related U.S. Application Data

(63) Continuation of application No. 17/366,631, filed on Jul. 2, 2021, now Pat. No. 12,039,151.

(30) Foreign Application Priority Data

Jul. 2, 2020  (CN) .......................... 202010632544.5
Nov. 9, 2020 (CN) .......................... 202011238921.3

(51) Int. Cl.
*G06F 3/04812* (2022.01)
*G06F 3/0483* (2013.01)
(Continued)

(52) U.S. Cl.
CPC ........ *G06F 3/0483* (2013.01); *G06F 3/04812* (2013.01); *G06F 3/0484* (2013.01);
(Continued)

(58) Field of Classification Search
CPC ................................................ G06F 3/048–05
See application file for complete search history.

(56) References Cited

U.S. PATENT DOCUMENTS 6,288,704 B1  9/2001  Flack et al.
7,574,668 B2  8/2009  Nunez et al.
(Continued)

FOREIGN PATENT DOCUMENTS

CN   1300415 A   6/2001
CN   1612600 A   5/2005
(Continued)

OTHER PUBLICATIONS

European Office Action dated Sep. 26, 2024, issued in European Patent Application No. 21 833 897.8-1218.
(Continued)

*Primary Examiner* — Matthew Ell
*Assistant Examiner* — Gabriel Mercado
(74) *Attorney, Agent, or Firm* — Jefferson IP Law, LLP

(57) ABSTRACT

An electronic apparatus and a page navigation method thereof are provided. The page navigation method includes obtaining first navigation information from a first information source, and obtaining second navigation information from a second information source, generating a first page navigation command based on the first navigation information, and generating a second page navigation command based on the second navigation information, and executing the first page navigation command and the second page navigation command.

18 Claims, 16 Drawing Sheets

(51) Int. Cl.
   *G06F 3/0484*   (2022.01)
   *G06F 3/04886*  (2022.01)
   *G06F 3/04815*      (2022.01)

(52) U.S. Cl.
   CPC ...... *G06F 3/04886* (2013.01); *G06F 3/04815* (2013.01); *G06F 2203/0381* (2013.01); *G06F 2203/04801* (2013.01); *G06F 2203/04802* (2013.01)

(56) References Cited

U.S. PATENT DOCUMENTS

| | | | |
|---|---|---|---|
| 7,716,604 B2 | 5/2010 | Kataoka et al. | |
| 8,416,187 B2 | 4/2013 | Margolis et al. | |
| 8,560,976 B1 | 10/2013 | Kim | |
| 8,831,902 B2 | 9/2014 | Wang | |
| 9,104,312 B2 | 8/2015 | Kay et al. | |
| 9,152,376 B2 | 10/2015 | Johnston et al. | |
| 9,411,488 B2 | 8/2016 | Kim et al. | |
| 9,479,817 B2 | 10/2016 | Kwon | |
| 9,582,049 B2 | 2/2017 | Kim et al. | |
| 9,788,045 B2 | 10/2017 | Kwon | |
| 10,057,623 B2 | 8/2018 | Kwon | |
| 10,419,807 B2 | 9/2019 | Kwon | |
| 10,771,836 B2 | 9/2020 | Kwon | |
| 10,999,619 B2 | 5/2021 | Kwon | |
| 11,164,576 B2 | 11/2021 | Pufahi et al. | |
| 11,526,252 B2 | 12/2022 | Arriola et al. | |
| 2005/0193348 A1 | 9/2005 | Nunez et al. | |
| 2006/0235698 A1 | 10/2006 | Cane et al. | |
| 2008/0046541 A1 | 2/2008 | Muller et al. | |
| 2009/0265627 A1 | 10/2009 | Kim et al. | |
| 2010/0017742 A1 | 1/2010 | Rhodes et al. | |
| 2010/0171700 A1* | 7/2010 | Sharan ............... | G06F 3/0237 345/161 |
| 2010/0262908 A1 | 10/2010 | Gallo et al. | |
| 2011/0300523 A1 | 12/2011 | Pope et al. | |
| 2011/0307804 A1 | 12/2011 | Spierer | |
| 2011/0310007 A1 | 12/2011 | Margolis et al. | |
| 2012/0032901 A1 | 2/2012 | Kwon | |
| 2012/0098743 A1 | 4/2012 | Lai et al. | |
| 2012/0179988 A1 | 7/2012 | Suh et al. | |
| 2012/0216117 A1 | 8/2012 | Arriola et al. | |
| 2012/0272179 A1 | 10/2012 | Stafford | |
| 2013/0001261 A1 | 1/2013 | Kumar et al. | |
| 2013/0033643 A1 | 2/2013 | Kim et al. | |
| 2014/0053195 A1 | 2/2014 | Sirpal et al. | |
| 2014/0089772 A1 | 3/2014 | Shetty et al. | |
| 2014/0125589 A1 | 5/2014 | Kim et al. | |
| 2014/0189601 A1 | 7/2014 | Kim et al. | |
| 2014/0204279 A1 | 7/2014 | Kwon | |
| 2014/0350941 A1 | 11/2014 | Zeigler et al. | |
| 2017/0031652 A1 | 2/2017 | Kam et al. | |
| 2017/0134790 A1 | 5/2017 | Kwon | |
| 2018/0121083 A1 | 5/2018 | Jiao et al. | |
| 2018/0129375 A1 | 5/2018 | Arriola et al. | |
| 2018/0329677 A1 | 11/2018 | Gruber et al. | |
| 2018/0352283 A1 | 12/2018 | Kwon | |
| 2019/0212892 A1 | 7/2019 | Karunamuni et al. | |
| 2019/0356942 A1 | 11/2019 | Kwon | |
| 2020/0280755 A1 | 9/2020 | Kwon | |

FOREIGN PATENT DOCUMENTS

| | | |
|---|---|---|
| CN | 102221975 | 10/2011 |
| CN | 102707866 A | 10/2012 |
| CN | 102736904 A | 10/2012 |
| CN | 102955797 A | 3/2013 |
| CN | 103353897 A | 10/2013 |
| CN | 103473348 A | 12/2013 |
| CN | 103809898 A | 5/2014 |
| CN | 104584062 A | 4/2015 |
| CN | 106210904 A | 12/2016 |
| CN | 106570032 A | 4/2017 |
| CN | 106681648 A | 5/2017 |
| CN | 109766073 A | 5/2019 |
| CN | 109889878 A | 6/2019 |
| CN | 110007815 A | 7/2019 |
| EP | 2 759 129 B1 | 4/2020 |
| JP | 4533791 B2 | 9/2010 |
| KR | 10-0898340 B1 | 5/2009 |
| KR | 10-0912310 B1 | 8/2009 |
| KR | 10-2012-0013727 A | 2/2012 |
| KR | 10-2013-0001261 A | 1/2013 |
| KR | 10-2013-0016016 A | 2/2013 |
| KR | 10-2014-0044204 A | 4/2014 |
| KR | 10-2014-0085061 A | 7/2014 |
| KR | 10-2017-0014353 A | 2/2017 |
| WO | 2013/022224 A1 | 2/2013 |

OTHER PUBLICATIONS

International Search Report with Written Opinion dated Oct. 13, 2021; International Appln. No. PCT/KR2021/008421.
Chinese Office Action with English translation dated Sep. 13, 2021; Chinese Appln. No. 202011238921.3.
Chinese Office Action with English translation dated Feb. 8, 2022; Chinese Appln. No. 202011238921.3.
Chinese Notice of Allowance with English translation dated Jun. 15, 2022; Chinese Appln. No. 202011238921.3.
Extended European Search Report dated Oct. 27, 2023, issued in European Patent Application No. 21833897.8.
Ken Hinckley and Daniel Wigdor (Input-Technologies-and-Techniques-HCI-Handbook-3rd-Edition, 2011), at least p. 4. (Year: 2011).
Schneider; Daniel et al. ("ReconViguRation: Reconfiguring Physical Keyboards in Virtual Reality", 2019). pp. 3-5 (Year: 2019).

* cited by examiner

PAGE NAVIGATION METHOD AND ELECTRONIC DEVICE

CROSS-REFERENCE TO RELATED APPLICATION(S)

This application is a continuation application of prior application Ser. No. 17/366,631, filed on Jul. 2, 2021, which is based on and claimed priority under 35 U.S.C. § 119 (a) of a Chinese patent application number 202010632544.5, filed on Jul. 2, 2020, in the China Intellectual Property Office, and of a Chinese patent application number 202011238921.3, filed on Nov. 9, 2020, in the China Intellectual Property Office, the disclosure of each of which is incorporated by reference herein in its entirety.

BACKGROUND

1. Field

The disclosure relates to the field of electronic device. More particularly, the disclosure relates to a page navigation method and electronic device.

2. Description of Related Art

Page navigation refers to moving a focus, such as a cursor or a focus box, from one position to another on a page, for example, moving the cursor from one element to another with a mouse.

Generally, a personal computer is equipped with a mouse and a keyboard, and a modern mobile device is equipped with a touch screen, both of which may be used to quickly move the focus. However, at present, there are many electronic devices without a mouse, a keyboard, and a touch screen, for example, large-screen devices such as televisions (TVs) and projection devices that require using arrow keys of a remote control, and special-shaped devices such as virtual reality (VR)/augmented reality (AR) (VR/AR) devices. None of these have a mouse or can be touched. In addition, for a traditional device, there are cases where peripherals such as a mouse, a keyboard, and a touch screen are unable to be used due to its physical defects.

Hence, technologies of the related art excessively rely on a mouse, a keyboard, and a remote control, and have the disadvantage of a single navigation information source, which is not conducive to navigation efficiency. For example, arrow keys on the keyboard may be used to move the focus from one element to another. However, the focus must go through all elements on the path and can require many keystrokes, thereby reducing the navigation efficiency.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a page navigation method, apparatus and electronic device, which can improve page navigation efficiency.

The technical solution of embodiments of the disclosure is implemented as follows.

Additional aspects will be set forth in part in the description which follows and, in part, will be apparent from the description, or may be learned by practice of the presented embodiments.

In accordance with an aspect of the disclosure, a page navigation method is provided. The page navigation method includes obtaining first navigation information from a first information source, and obtaining second navigation information from a second information source, generating a first page navigation command based on the first navigation information, and generating a second page navigation command based on the second navigation information, and executing the first page navigation command and the second page navigation command.

In an embodiment, the first information source includes at least one of a mouse, a keyboard and a remote control, and the second information source includes at least one of a voice microphone, a two-dimensional camera, a three-dimensional camera, an infrared camera, a motion sensor, a posture sensor, a wearable device, a shared sensor information source on a remote mobile device, an analog data generator, or an analog remote control.

In an embodiment, the executing of the first page navigation command and the second page navigation command includes executing the second page navigation command to move a focus in a page according to a second movement speed, and executing the first page navigation command to move the focus in the page according to a first movement speed, wherein the second movement speed is greater than the first movement speed.

In an embodiment, the generating of the second page navigation command based on the second navigation information includes parsing a page to determine points of interest, and generating the second page navigation command for controlling a focus to jump between the points of interest, based on the second navigation information.

In an embodiment, the points of interest include interactive elements or non-interactive elements.

In an embodiment, the generating of the second page navigation command based on the second navigation information includes parsing a tiled page containing a plurality of TAB tables to generate a cascading state table containing the plurality of TAB tables, generating the second page navigation command for displaying the cascading state table, and the executing of the first page navigation command and the second page navigation command includes executing the second page navigation command to display the cascading state table, and executing the first page navigation command to traverse a focus between the TAB tables of the cascading state table.

In an embodiment, the displaying of the cascading state table includes at least one of displaying the cascading state table in a rotating display mode, displaying the cascading state table in a tiled display mode, or displaying the cascading state table in a tree display mode.

In an embodiment, the executing of the first page navigation command and the second page navigation command includes executing the second page navigation command to switch a predetermined candidate focus in a page to an active focus, and executing the first page navigation command to move a focus in the page from a position of the active focus.

In an embodiment, the page navigation method further includes setting an initial position of the candidate focus as a position that a user recently clicked on a page or panel, according to a user click history on the page or panel, or discretely placing candidate focuses on a plurality of areas of the page or panel according to a number of candidate focuses.

In accordance with another aspect of the disclosure, an electronic device is provided. The electronic device includes an obtaining module configured to obtain first navigation information from a first information source, and obtain second navigation information from a second information source, a command generation module configured to generate a first page navigation command based on the first navigation information, and generate a second page navigation command based on the second navigation information, and an execution module configured to execute the first page navigation command and the second page navigation command.

In an embodiment, the first information source includes at least one of a mouse, a keyboard, or a remote control, and the second information source includes at least one of a voice microphone, a two-dimensional camera, a three-dimensional camera, an infrared camera, a motion sensor, a posture sensor, a wearable device, a shared sensor information source on a remote mobile device, an analog data generator, or an analog remote control.

In an embodiment, the execution module is further configured to execute the second page navigation command to move a focus in a page according to a second movement speed, and execute the first page navigation command to move the focus in the page according to a first movement speed, wherein the second movement speed is greater than the first movement speed.

In an embodiment, the command generation module is further configured to parse a page to determine points of interest and generate the second page navigation command for controlling a focus to jump between the points of interest, based on the second navigation information.

In an embodiment, the points of interest include interactive elements or non-interactive elements.

In an embodiment, the command generation module is further configured to parse a tiled page containing a plurality of TAB tables to generate a cascading state table containing the plurality of TAB tables, and generate the second page navigation command for displaying the cascading state table, and the execution module is further configured to execute the second page navigation command to display the cascading state table and execute the first page navigation command to traverse a focus between the TAB tables of the cascading state table.

In an embodiment, the execution module is further configured to execute at least one of displaying the cascading state table in a rotating display mode, displaying the cascading state table in a tiled display mode, or displaying the cascading state table in a tree display mode.

In an embodiment, the execution module is further configured to execute the second page navigation command to switch a predetermined candidate focus in a page to an active focus, and execute the first page navigation command to move a focus in the page from a position of the active focus.

In an embodiment, the execution module is further configured to set an initial position of the candidate focus as a position that a user recently clicked on a page or panel, according to a user click history on the page or panel, or discretely place candidate focuses on a plurality of areas of the page or panel according to a number of candidate focuses.

In accordance with another aspect of the disclosure, an electronic device is provided. The electronic device includes a processor and a memory. The memory stores an application program executable by the processor, and the application program causes the processor to execute one of the above methods.

In accordance with yet another aspect of the disclosure, a computer-readable storage medium is provided. The computer-readable storage medium stores computer-readable instructions, wherein the computer-readable instructions are configured to execute one of the above methods.

It can be seen from the above technical solution that the first navigation information is obtained from the first information source and the second navigation information is obtained from the second information source, the first page navigation command is generated based on the first navigation information and the second page navigation command is generated based on the second navigation information, and the first page navigation command and the second page navigation command are executed. It can also be seen that in the embodiments of the disclosure, the navigation information is obtained from a plurality of information sources, and the navigation may be implemented separately based on a plurality of page navigation commands, thereby improving navigation efficiency.

Moreover, the focus may be moved quickly by executing the second page navigation command, and the focus may be accurately adjusted by executing the first page navigation command.

In addition, a shuttle time may be significantly reduced through three-dimensional navigation in a cascading state. Through the cooperation of the first page navigation command and the second page navigation command, the focus can be quickly moved based on focus switching, which can significantly reduce the number of keystrokes.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
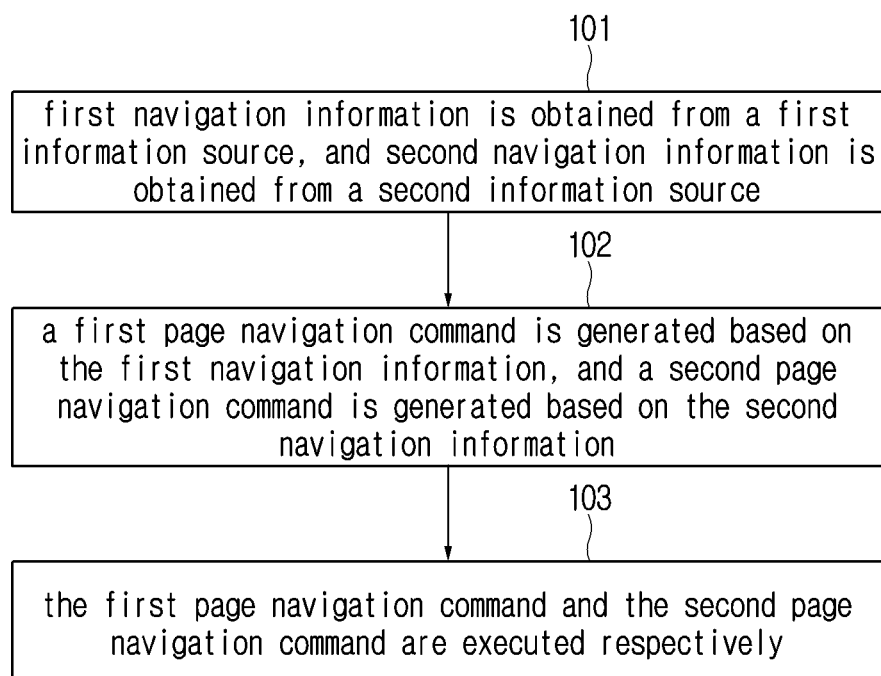
FIG. 1 is a flowchart of a page navigation method according to an embodiment of the disclosure.

The following description with reference to the accompanying drawings is provided to assist in a comprehensive understanding to various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the sake of simplicity and intuition in description, the solutions of the disclosure will be illustrated by describing several various embodiments below. A large number of details in the embodiments are only used for understanding the solutions of the disclosure. However, it is obvious that the technical solutions of the disclosure may not be limited to these details when implemented. In order to avoid unnecessarily obscuring the solutions of the disclosure, some embodiments are not described in detail, but only a framework is provided. Hereinafter, "include" means "include but not limited to," and "according to" means "at least according to . . . , but not limited to only according to . . . ". When the quantity of components is not specifically indicated below, it means that the quantity of the components may be one or more, or may be understood as at least one.

In an embodiment of the disclosure, a technical solution for interface navigation based on multi-input cooperative operation is provided, which integrates input information of other peripherals that may be used for navigation in addition to existing navigation peripherals (such as a mouse and arrow keys), and transforms the information into an auxiliary navigation input to control the movement of a focus concurrently with the existing navigation peripherals.

Further, an embodiment of the disclosure also provides a method for accelerating navigation through three-dimensional accelerated navigation and a dense region candidate focus, which may significantly reduce the number of keystrokes and optimize the navigation efficiency.

FIG. 1 is a flowchart of a page navigation method according to an embodiment of the disclosure.

Referring to FIG. 1, at operation 101, first navigation information is obtained from a first information source, and second navigation information is obtained from a second information source.

The first information source is preferably a traditional navigation peripheral, such as a mouse, a keyboard, a remote control, and so on. The first navigation information is provided by the first information source and used to implement navigation, such as a trigger event of arrow keys on a keyboard or a remote control, or a click trigger event of a mouse.

The second information source may be implemented as an auxiliary navigation peripheral, including at least one of a voice microphone, a two-dimensional camera, a three-dimensional camera, an infrared camera, a motion sensor, a posture sensor, a wearable device, a shared sensor information source on a remote mobile device, an analog data generator, an analog remote control, etc. The second navigation information is provided by the second information source and used to implement navigation, such as a gesture instruction detected by the two-dimensional camera, or a voice instruction detected by the voice microphone.

Various examples of the first information source and the second information source are described. Those skilled in the art should understand that this description is only exemplary and is not used to limit the protection scope of the embodiment of the disclosure.

At operation 102, a first page navigation command is generated based on the first navigation information, and a second page navigation command is generated based on the second navigation information.

The generating of the first page navigation command based on the first navigation information includes: generating a corresponding page navigation command based on a trigger event provided by a mouse, a keyboard, a remote control, and the like. For example, navigation commands of moving a focus up, down, left and right are generated based on respective trigger events of four arrow keys on the keyboard or the remote control. The generating of the second page navigation command based on the second navigation information includes generating a corresponding page navigation command based on sensor information provided by the voice microphone, the two-dimensional camera, the three-dimensional camera, the infrared camera, the motion sensor, the posture sensor, the wearable device, the shared sensor information source on the remote mobile device, the analog data generator, or the analog remote control. For example, a navigation command for moving a focus to the left may be generated based on voice information detected by the voice microphone, or a navigation command for moving a focus to the left may be generated based on left-hand sliding information detected by the gesture sensor.

At operation 103, the first page navigation command and the second page navigation command are executed.

The first page navigation command and the second page navigation command are independent of each other. The process of executing the first page navigation command and the process of executing the second page navigation command do not share hardware resources, so the first page navigation command and the second page navigation command drive the focus independently and complementarily.

The meaning of executing the first page navigation command and the second page navigation command in operation 102 includes at least one of (1) executing the first page navigation command first, and then executing the second page navigation command, (2) executing the second page navigation command first, and then executing the first page navigation command, or (3) executing the first page navigation command and the second page navigation command at the same time.

In one embodiment, in operation 103, the second page navigation command is executed to move the focus on the page according to a second movement speed, and the first page navigation command is executed to move the focus on the page according to a first movement speed. The second movement speed is greater than the first movement speed.

It can be seen that the focus may be moved quickly by executing the second page navigation command, and the focus may be accurately adjusted by executing the first page navigation command.

In one embodiment, the generating of the second page navigation command based on the second navigation information in operation 102 includes parsing the page to determine points of interest, and generating the second page navigation command for controlling the focus to jump between the points of interest, based on the second navigation information. Preferably, the points of interest include interactive elements or non-interactive elements.

Therefore, in an embodiment of the disclosure, the focus may be quickly moved by executing the second page navigation command for controlling the focus to jump between the points of interest, and the focus may be accurately adjusted by executing the first page navigation command.

In an embodiment, the generating of the second page navigation command based on the second navigation information in operation 102 includes parsing a tiled page containing a plurality of TAB tables to generate a cascading state table containing the plurality of TAB tables, and generating the second page navigation command for displaying the cascading state table. The executing of the first page navigation command and the second page navigation command in operation 103 includes executing the second page navigation command to display the cascading state table, and executing the first page navigation command to traverse the focus between the TAB tables of the cascading state table. Preferably, the displaying of the cascading state table includes at least one of displaying the cascading state table in a rotating display mode, displaying the cascading state table in a tiled display mode, or displaying the cascading state table in a tree display mode.

It can be seen that an embodiment of the disclosure may significantly reduce the shuttle time through three-dimensional navigation in a cascading state.

In an embodiment, the executing of the first page navigation command and the second page navigation command in operation 103 includes executing the second page navigation command to switch a predetermined candidate focus on the page to an active focus, and executing the first page navigation command to move the focus on the page from a position of the active focus.

In one embodiment, according to a user click history on the page or panel, an initial position of the candidate focus is set as a position that the user recently clicked (recently in time) on the page or panel, or according to a number of candidate focuses. The candidate focuses are discretely placed on a plurality of areas of the page or panel. The discrete placing of the candidate focuses on the plurality of areas of the page or panel may be implemented as discretely placing the candidate focuses on the plurality of areas of the page or panel evenly, or discretely placing the candidate focuses on the plurality of areas of the page or panel unevenly.

Therefore, in an embodiment of the disclosure, through cooperation of the first page navigation command and the second page navigation command, the focus may be quickly moved based on the focus switching, thereby significantly reducing the number of keystrokes.

Therefore, in an embodiment of the disclosure, a technical solution for in-page navigation based on multi-input cooperative operation is provided. Under the premise that the existing first information source (such as arrow keys) is consumed by a rendering engine to achieve webpage functions or unchanged space navigation, an auxiliary navigation layer (corresponding to an auxiliary navigation function achieved based on the second information source) is newly added in the overall system perspective. The auxiliary navigation layer integrates input information of other peripherals that may be used for navigation in addition to the existing navigation peripherals, and uses this information for cooperative operation and navigation acceleration, so as to achieve functions that cannot be completed independently by the existing navigation keys of the related art. Since new and existing navigation targets both function on and drive focus elements, they may complement each other. The newly added auxiliary navigation layer is a relatively independent subsystem, which does not need to reuse the existing navigation keys and thus does not conflict with the existing functions. In addition, the auxiliary navigation may be accurate or fuzzy. According to auxiliary signals that the peripherals may provide, an acceleration function may also be provided based on the existing navigation.

Figure 2:
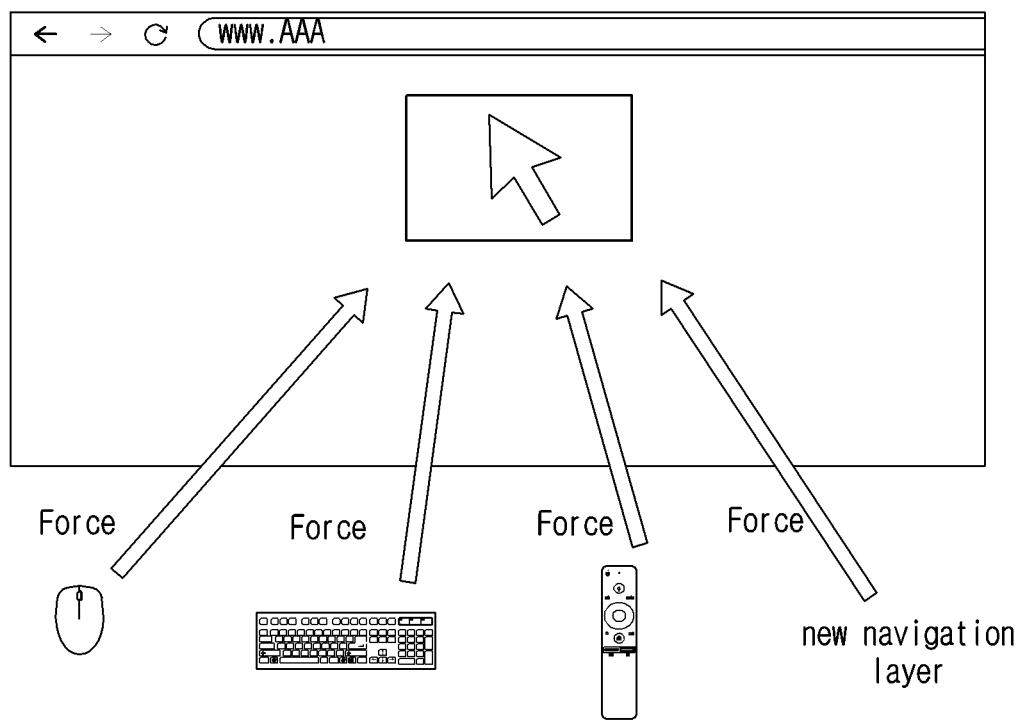
FIG. 2 is a diagram of driving a focus independently and complementarily by using an auxiliary navigation layer and other navigation peripherals according to an embodiment of the disclosure.

FIG. 2 is a diagram of driving a focus independently and complementarily by using an auxiliary navigation layer and other navigation peripherals, according to an embodiment of the disclosure.

Referring to FIG. 2, in addition to traditional navigation peripherals corresponding to the first information source, such as a mouse, a keyboard, and a remote control, an auxiliary navigation layer corresponding to the second information source is further added in an embodiment of the disclosure. On the one hand, the auxiliary navigation layer collects sensor information available to the system and converts the collected sensor information into navigation information. On the other hand, the auxiliary navigation layer plans/optimizes a navigation path on an abstract layer through the content characteristics of a navigation target, and then executes a navigation operation through a platform interface to drive the cursor or focus to move to a navigation destination.

Various embodiments of the disclosure will be described below.

First Embodiment

The first information source may be implemented as a remote control, the second information source may be implemented as a posture sensor, and a user simultaneously uses gestures and the remote control to quickly move a focus such as a cursor on a browser.

If a cursor-based navigation drive mode is used on the page, the cursor will be moved relatively slowly at a given operation by clicking arrow keys of the remote control. In a process of browsing a webpage or a local native program page, a large number of clicks (or long presses) of the arrow keys may be required to move the cursor.

The auxiliary navigation layer provided by an embodiment of the disclosure drives the cursor to move by converting the user's gesture information into a navigation command. The user may set a frequency of the auxiliary navigation layer driving the cursor, to control that the speed of moving the cursor by gestures is faster than the speed of moving the cursor by the arrow keys. For example, the user may quickly move the cursor through a predetermined gesture of the left hand, and at the same time slightly adjust a position of the cursor through the remote control in the right hand. Because the two navigation modes do not reuse resources, the gesture navigation may be started or stopped at any time.

Second Embodiment

The first information source may be implemented as a remote control, the second information source may be implemented as a gesture sensor, and the user simultaneously uses gestures and the remote control to quickly move a focus such as a cursor on a browser.

If the cursor-based navigation drive mode is used on the page, the cursor will be moved relatively slowly at a given operation by clicking arrow keys of the remote control. A large number of clicks (or long presses) of the arrow keys may be required during the browsing process to drive the cursor to move, because of an important influence factor: normally, the cursor moves continuously and thus, even in a blank area, a plurality of clicks are required to traverse.

Figure 3:
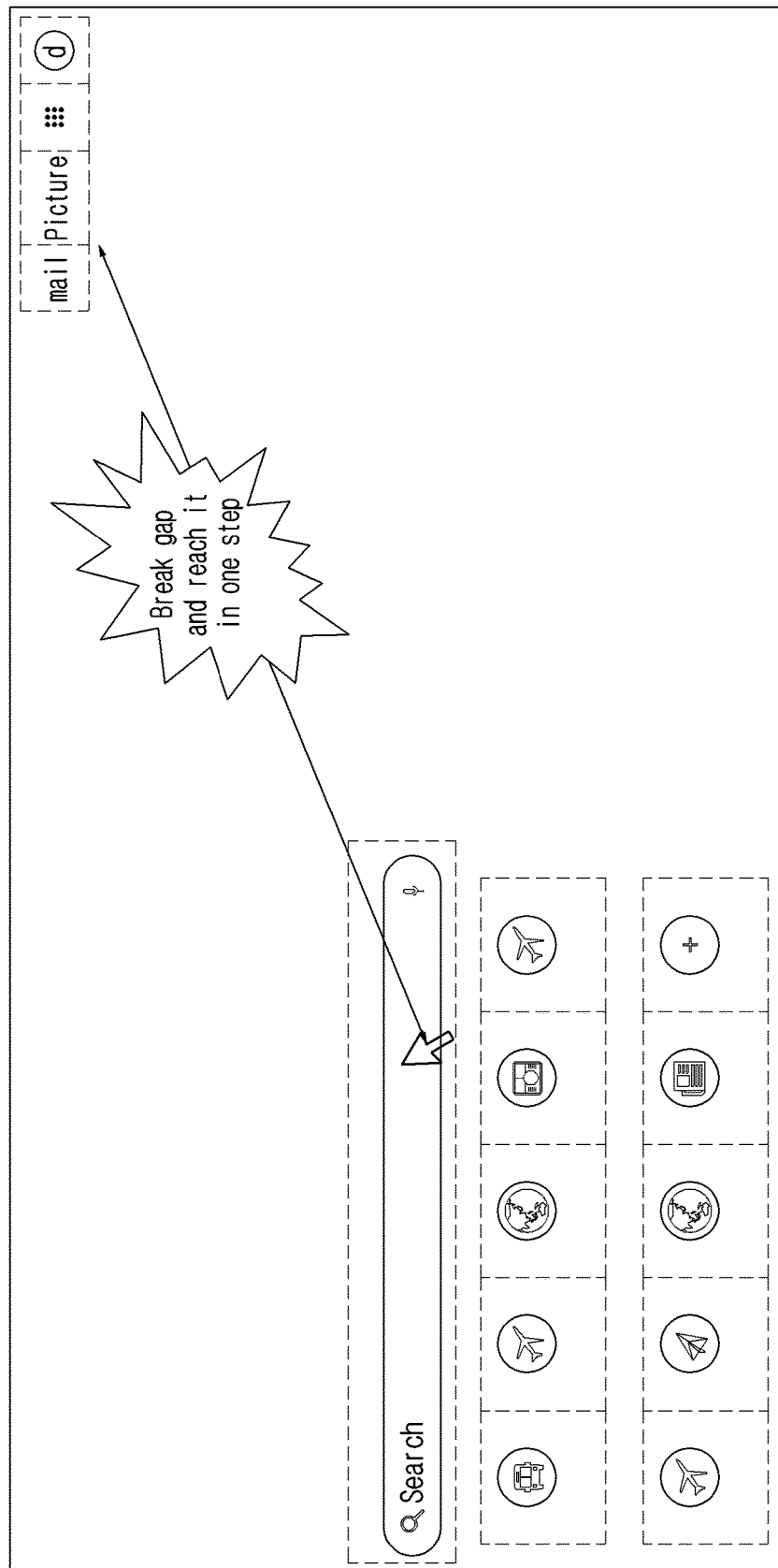
FIG. 3 is a diagram of quickly navigating a focus to a next element of interest according to an embodiment of the disclosure.

FIG. 3 is a diagram of quickly navigating a focus to a next element of interest according to an embodiment of the disclosure.

Referring to FIG. 3, the auxiliary navigation layer provided by an embodiment of the disclosure determines interactive elements (such as pictures or videos) as points of interest according to the characteristics of the current screen content. In the navigation process based on gestures, the auxiliary navigation layer skips the blank area and elements of non-interest on the path, and directly sets the cursor to the next element of interest in the navigation direction. Afterwards, the user may determine to use or not use the arrow keys of the remote control for fine adjustment according to his needs. Since the arrow keys are not affected by the auxiliary navigation layer, the user can also move the cursor back to the blank area. Optionally, the user may also set the points of interest as all visible elements, and thus only the blank area is skipped when the auxiliary navigation layer moves the cursor.

Third Embodiment

The first information source may be implemented as a keyboard, the second information source may be implemented as a microphone, and the user uses voice to move a focus.

If the running environment of an application uses a navigation drive mode based on space navigation, the focus will be driven to move between interactive elements by clicking arrow keys of the keyboard. On the one hand, due to the large number of Internet pages and defects of webpage content authors' design for page accessibility, some webpage components may have already occupied the arrow keys. Accordingly, when the focus is moved to these elements, the focus cannot be moved away through the arrow keys. For example, drop-down boxes of many websites have this problem. On the other hand, some complex components may occupy the arrow keys even if they are designed in accordance with the recommendations of the world wide web consortium (W3C). For example, a playback controller often uses up and down keys to control audio volume, and uses left and right keys to control a playback progress bar. Once the focus is moved to such components, the focus cannot be moved away through the arrow keys.

Figure 4:
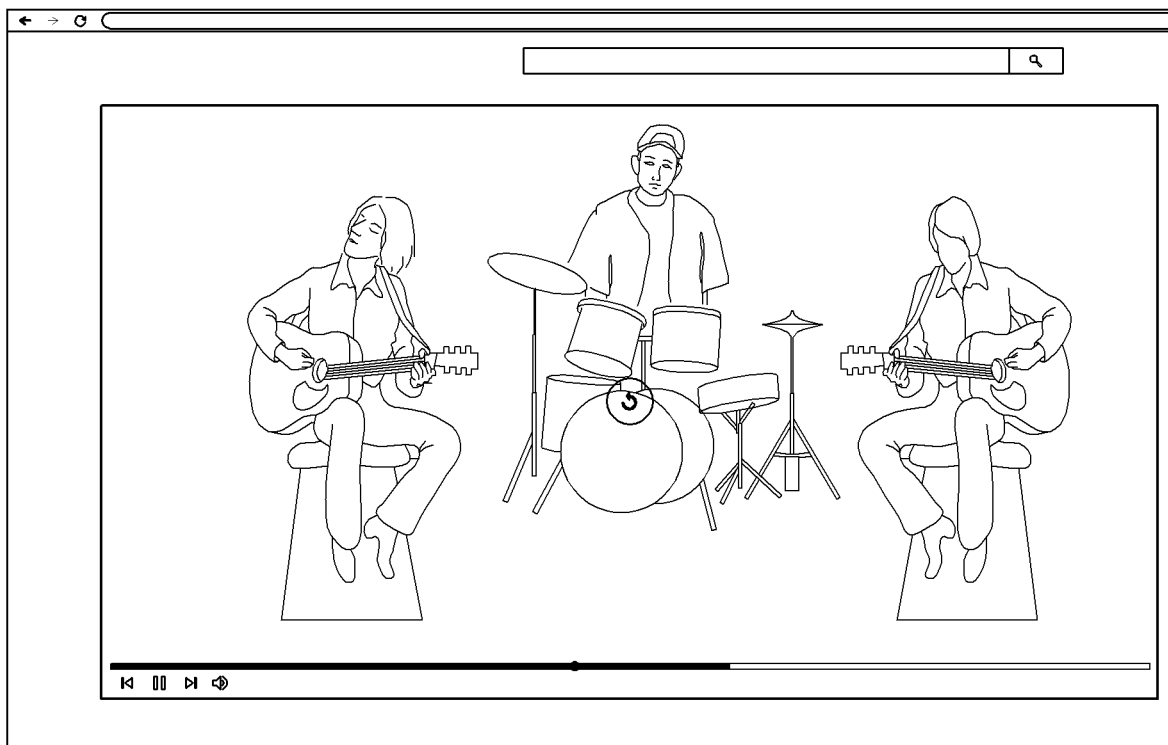
FIG. 4 is a diagram of navigation failure caused by function conflicts of arrow keys according to the related art.

FIG. 4 is a diagram of navigation failure caused by function conflicts of arrow keys according to the related art.

Referring to FIG. 4, in an embodiment of the disclosure, voice navigation provided by a microphone may be used as the auxiliary navigation layer. Since the navigation using the microphone is independent from the navigation using the arrow keys, the user may directly move the stuck focus through other voice commands. Moreover, after the focus is moved away from the stuck position, the user may continue to use the four arrow keys of the keyboard to drive the focus to move between the interactive elements.

Fourth Embodiment

The user may implement three-dimensional movement on the page by using auxiliary navigation.

Regardless of whether the page is web or native, most existing pages are either based on a personal computer (PC) display environment or based on a mobile device, fewer of them consider a display environment of large screen and large display area, and fewer of them consider an environment of an infinite display area (e.g., VR/AR). Due to the limited display area, pages are often displayed in categories/pages. For example, referring to FIG. 5, a large number of pages may be classified into a plurality of TAB pages according to different types, and only the content of one TAB is displayed currently. The display list of webpages similar to search results of a search application is split into a plurality of sub-pages, and only the content of one sub-page is displayed currently. Further, function menus at the top of software such as Office are stacked with different TAB panels, and only one panel is displayed at a time. For such pages, in order to navigate from a position in one TAB page to a position in another TAB page, regardless of whether the cursor navigation or the focus navigation is used, the cursor or the focus must first be moved to a TAB head and clicked to expand the corresponding TAB, and then moved to the corresponding position in the corresponding TAB. Since the moving path of the cursor and the focus is very long, frequent operations may make the user physically and mentally exhausted.

Figure 5:
FIG. 5 is a diagram illustrating that continuous space navigation shuttles between TABs according to the related art.
Figure 5:
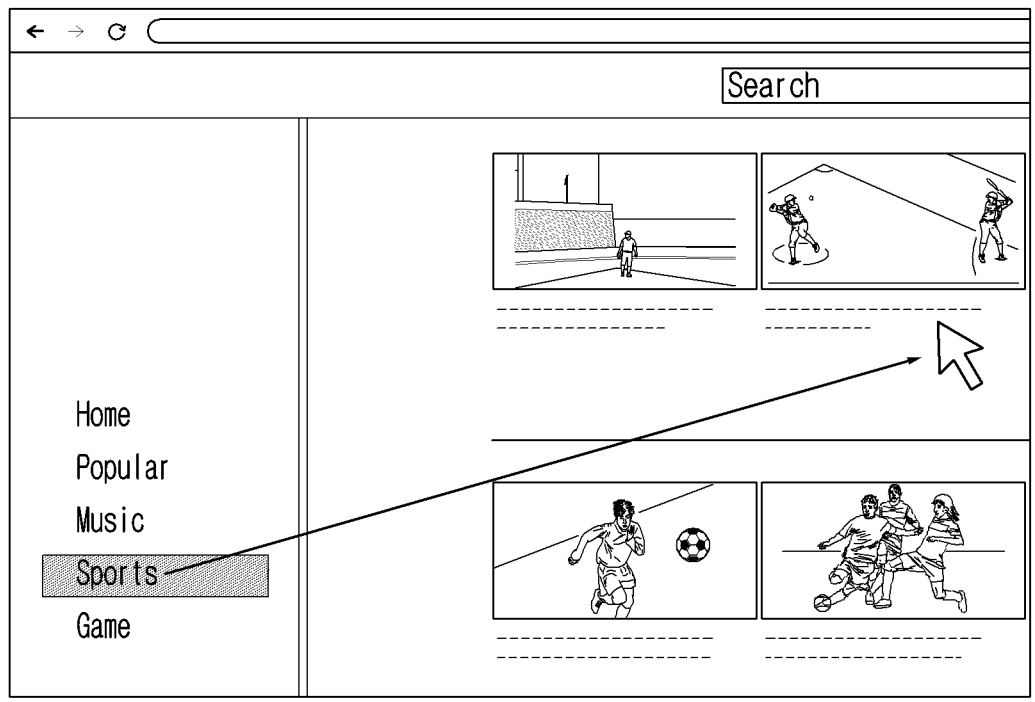

FIG. 5 is a diagram illustrating that continuous space navigation shuttles between TABs according to the related art.

Referring to FIG. 5, the auxiliary navigation introduced in an embodiment of the disclosure allows the user to use both hands to control. For example, the gesture of the left hand may trigger to enter a three-dimensional expansion state, and the folded content of the current page will be expanded in some form (e.g., tree expansion, tiled expansion, or three-dimensional expansion). Afterwards, the right hand directly performs penetrating navigation between the expanded TAB pages. After the three-dimensional expansion state is cancelled, the cursor or the focus has jumped to the corresponding position in the corresponding page.

For example, the TAB pages that may be folded together may be regarded as a book. Suppose an ant wants to walk from coordinates (e.g., row 10, column 10) of a first page of the book to the coordinates (e.g., row 10, column 10) of a fifth page of the book. In the prior art, the ant must walk from the coordinates (row 10, column 10) of the first page to the edge of the first page, then walk from the edge of the first page to the edge of the fifth page, and finally walk from the edge of the fifth page to the coordinates (row 10, column 10) of the fifth page.

Figure 6:
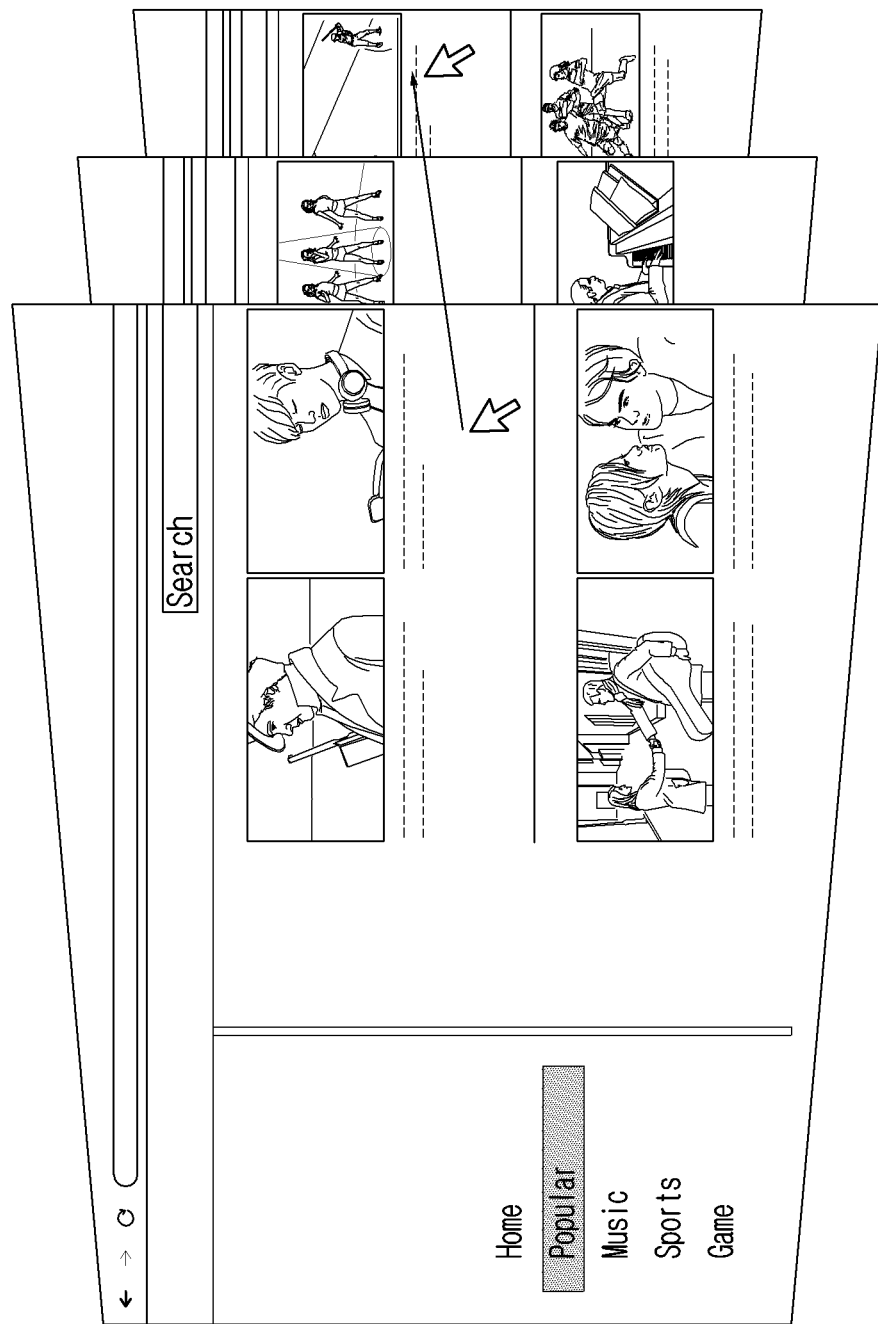
FIG. 6 is a diagram of implementing three-dimensional navigation in combination with an auxiliary navigation layer according to an embodiment of the disclosure.

FIG. 6 is a diagram of implementing three-dimensional navigation in combination with an auxiliary navigation layer according to an embodiment of the disclosure.

Referring to FIG. 6, after a three-dimensional expansion mode is entered, movement is equivalent to drilling a hole through the entire book at a position of the coordinates (e.g., row 10, column 10), and the ant may directly walk from the coordinates (row 10, column 10) of the first page to the same coordinates (row 10, column 10) of the fifth page along the hole with 4 operations. In addition, after the three-dimensional expansion state is exited, the hole is restored, the book is opened to the fifth page, and the ant is on the coordinates (row 10, column 10) of the fifth page.

Therefore, the three-dimensional focus movement provided by an embodiment of the disclosure can reduce the number of keystrokes for remote control navigations, and the expansion mode may use the advantages of large screens, large display areas, and the infinite display areas of VR/AR devices.

Fifth Embodiment

The user may use auxiliary navigation to reduce the number of movements in a dense interaction area.

The input method interface is a typical dense interaction area, which may be a native component or a part of webpage content. A beginning typist knows that each finger must cover a small area, to improve the typing speed by reducing the movement distance of fingers. Even on a mobile phone, it is found that the input with two fingers is much faster than that with one finger. However, when the user uses the remote control, it is equivalent to an operation with only one finger. What is worse is that the finger cannot jump yet, and must slide through every key between two points against the input method interface.

Figure 7:
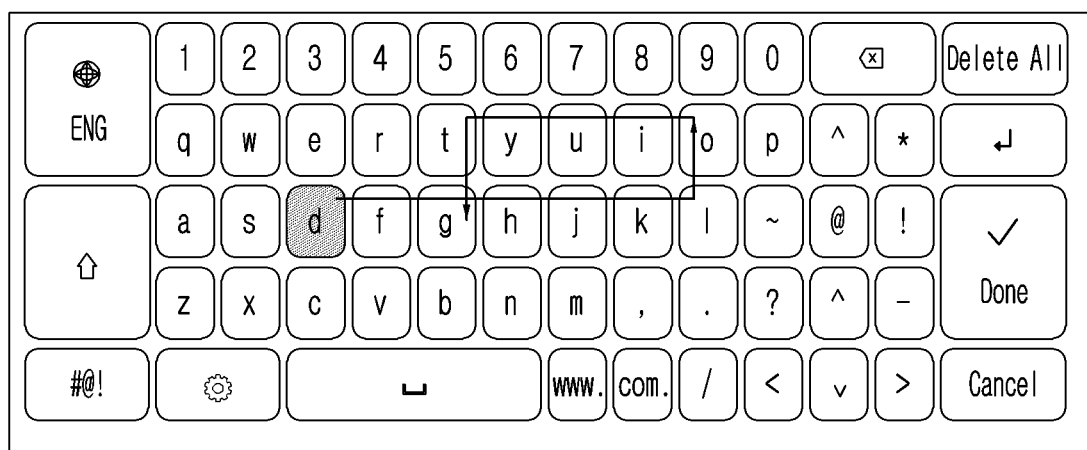
FIG. 7 is a diagram of inputting a word according to the related art.

FIG. 7 is a diagram of inputting a word according to the related art.

Referring to FIG. 7, when the focus starts at the letter "D," in order to input the word "DOG," the user must press the enter key 3 times and the arrow keys 12 times on the remote control, i.e., a total of 15 key operations, to complete the input, which can very cumbersome.

The method of combining auxiliary navigation in an embodiment of the disclosure allows the user to operate with both hands (i.e., with multiple inputs) and jump forward. An embodiment of the disclosure introduces candidate focuses and an active focus in the dense interaction area through the method of multi-input cooperative operation. The user may set two or more candidate focuses, and only one of the candidate focuses may be used as the active focus at any time. The user triggers the switching of the active focus between the candidate focuses through an additional input mode. After switching, the arrow keys are used to control the movement of the current active focus to achieve jumping.

FIGS. 8A to 8E are diagrams of reducing the number of keystrokes in a dense operation area via a multi-input cooperative operation according to various embodiments of the disclosure. Two candidate focuses, namely the keys D and L, are preset.

Referring to FIGS. 8A to 8E, a typical scenario is as follows. The user triggers the switching of the candidate focuses through a gesture instruction issued by one hand, and the other hand drives the current active focus via the arrow keys after the switching to continue navigation. In this way, when the focus starts at the letter "D," "DOG" may be inputted by pressing the enter key 3 times, the arrow keys 3 times, and the candidate focus switching operation 2 times. Accordingly, the number of keystrokes is significantly reduced, and the left and right hands can operate cooperatively.

Further, the candidate focus switching operation may also be used instead of pressing the enter key to trigger input, thereby further reducing the number of keystrokes. For example, the candidate focus switching operation after the active focus is moved is set to trigger the direct input of the element under the current active focus. In this way, the enter key presses for "D" and "O" may be omitted, and the total number of keystrokes may be reduced by almost half.

Further, a page turning scenario may be optimized in combination with the fourth embodiment.

FIGS. 8A to 8E, an embodiment in which 'focus' is a 'focus box' is illustrated, but the present disclosure is not limited thereto. That is, instead of the 'focus box' shown in 8A to 8E, an 'active cursor' and a plurality of 'candidate cursors' may be displayed.

Figure 9:
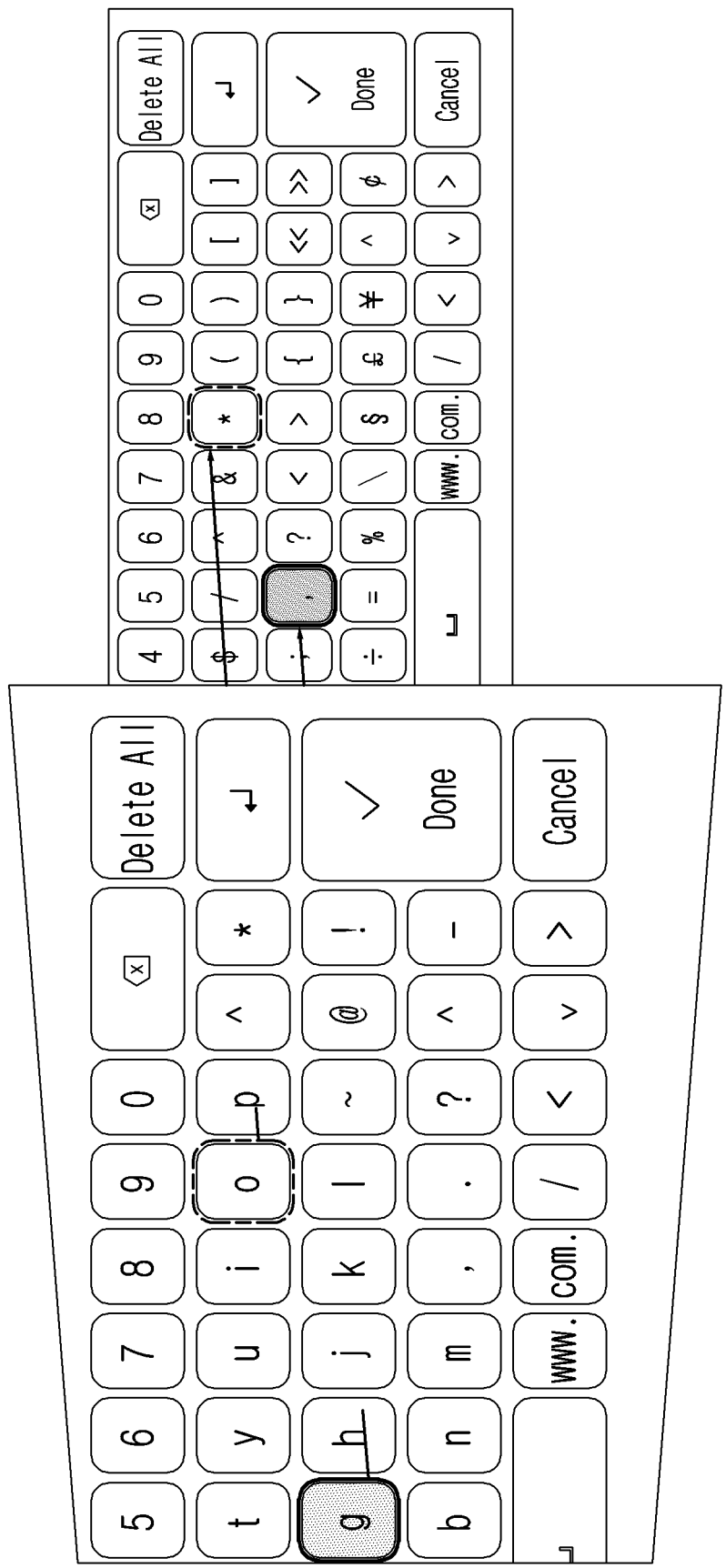
FIG. 9 is a diagram of reducing the number of keystrokes required for repeated page turning operations according to an embodiment of the disclosure.

FIG. 9 is a diagram of reducing the number of keystrokes required for repeated page turning operations according to an embodiment of the disclosure.

Referring to FIG. 9, under normal circumstances, when symbols and letters are inputted, the focus must be moved to a page switching key for page turning. By using the optimization method of the fourth embodiment, the number of keystrokes required for a route to and from a page turning key may be avoided. The sensor signal for triggering the switching between candidate focuses is not limited to a gesture. The sensor signal may be customized according to different devices and use environments. For example, for very close operating environments such as VR and AR, the switching between candidate focuses may be triggered by detecting eye movement, and the nearest candidate focus in a vector direction may be found along the movement vector of the user's eye and may be switched into the current active focus. For another example, a special-shaped device provided to a special crowd may be just a simple switch.

The embodiments of the disclosure are described above. Those skilled in the art should understand that this description is only exemplary and is not used to limit the protection scope of the embodiments of the disclosure.

It can be seen that the disclosure relates to the navigation control of a focus and the like during a user's electronic browsing process. The auxiliary navigation layer (or, referred to as a "global auxiliary navigation subsystem") is newly added based on existing traditional peripherals of the current system, which includes sub-modules such as a user configuration sub-module, a sensor information integration sub-module, a navigation path planning sub-module, and a navigation command execution sub-module. The sensor information integration sub-module is configured to integrate all sensor and simulation resources available in the current system and convert them into formatted auxiliary navigation input data. The navigation path planning sub-module performs auxiliary navigation path planning through the characteristic analysis results of the currently presented content and the navigation input data, and obtains a navigation command for output. The navigation command execution sub-module triggers the execution of navigation through a suitable system interface.

The auxiliary navigation control provided by the disclosure is independent from and complementary to the current existing navigation control, and they are independent of each other and do not interfere with each other, thereby providing the user with more flexible navigation options. Because the auxiliary navigation control does not share hardware resources with the existing navigation control, the user can realize the auxiliary navigation control without reusing the current function keys. The auxiliary navigation control can be enabled and exited in a simple and smooth mode, and may be called at will by the user. Meanwhile, the newly added auxiliary navigation provides improved performance according to the obtained navigation data, and the user may use the auxiliary navigation in combination with the existing navigation resources according to the accuracy of the auxiliary navigation.

Figure 10:
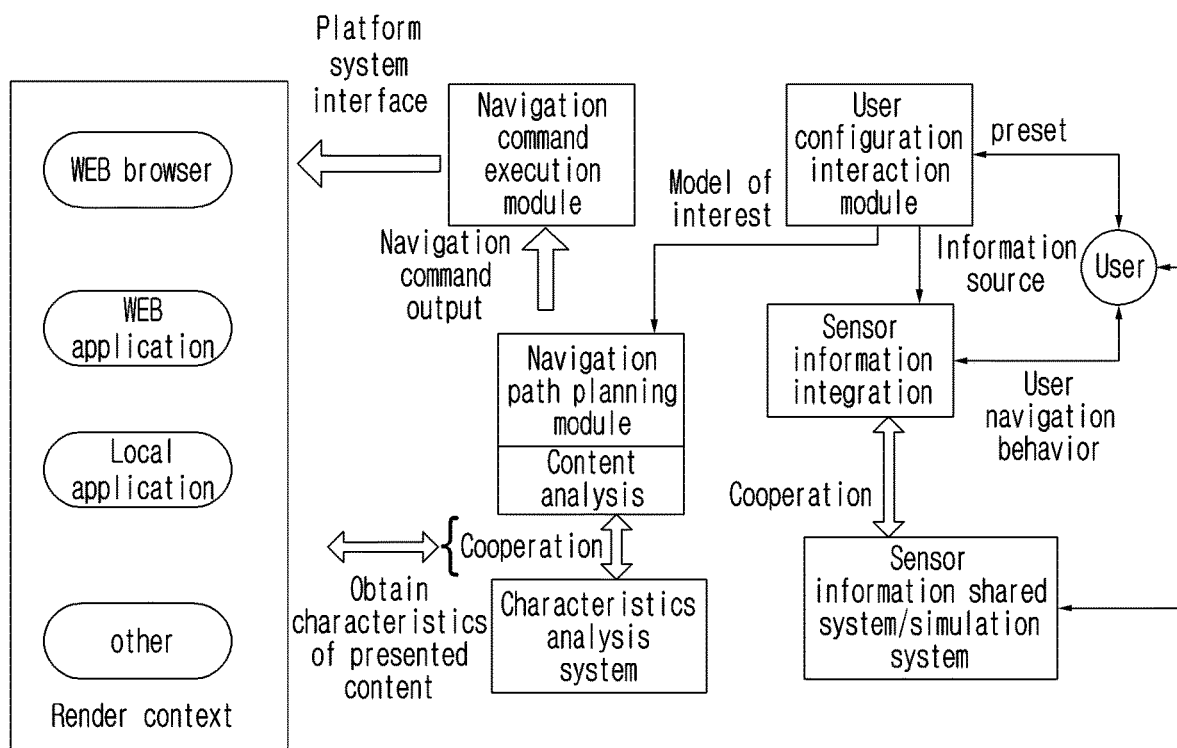
FIG. 10 is a diagram of architecture for implementing page navigation according to an embodiment of the disclosure.

FIG. 10 is a diagram of architecture for implementing page navigation according to an embodiment of the disclosure.

Referring to FIG. 10, the user configures and enables the auxiliary navigation subsystem, selects an available sensor information source/simulation information source, and completes adaptive debugging of sensor information. The sensor information integration sub-module is enabled. The background process monitors and obtains the input of the sensor/simulation information source, and converts the input into navigation guidance data for output. After the navigation path planning sub-module receives the input of navigation data, a sampling system presents the content, obtains positions of navigable elements, analyzes the navigation path to obtain a destination navigation position, and outputs a navigation instruction. The navigation command execution module calls a corresponding platform system interface according to the incoming navigation instruction, triggers the cursor and the focus to move, and further triggers navigation operations such as page expansion or jump.

Specifically, the main functions of the user configuration module include the following:
(1) The user decides whether to enable the auxiliary navigation subsystem.
(2) All available sensor resources and simulation resources are enumerated. The sensor resources include, but are not limited to: various sensor peripheral resources equipped on the current device, e.g., a voice microphone, various (two-dimensional, three-dimensional, and infrared) cameras, a motion sensor, a posture sensor, etc. In addition, the sensor resources also include external sensor information resources obtained through a sensor information sharing subsystem, e.g., sensor information on wearable devices such as smart watches obtained through Bluetooth pairing, and sensor information shared on remote mobile devices obtained through unified account association. The simulation resources include, but are not limited to: sensor data simulated by software on the current system or other connected systems, e.g., a variety of sensor information simulated by a software data generator, navigation key information sent by a mobile phone simulated remote control, and so on.
(3) The user debugs the selected information source to further select an appropriate sampling frequency (corresponding to the navigation speed and sensitivity). For an information source with a large number of continuous inputs, data frames may be discarded according to the sampling frequency to adjust the sensitivity. Optionally, a default movement step length may be set, that is, the movement distance of one navigation operation triggered by simple direction information in the absence of elements of interest. For example, when the input information of the sensor source does not include a movement distance, but includes only several specific simple state changes (corresponding to a specific direction), it is similar to a default step length obtained through pressing the arrow keys of the remote control by the user to drive the cursor to move. When no model of interest is configured, the user sets the default step length of auxiliary navigation to a relatively large value, so that a large distance may be jumped according to each auxiliary navigation command, and then a small distance may be jumped by cooperating with the arrow keys of the remote control, thereby achieving the cooperative effect of quick adjustment and fine adjustment (e.g., as in the first embodiment).
(4) A model of interest for auxiliary navigation is selected and accelerated three-dimensional navigation is enabled. The model of interest for navigation includes whether to set elements of interest, for example, not set elements of interest, set as interactive elements, set as visible elements, set as a certain type or several types of specific elements, set as elements with certain characteristics, etc. The accelerated three-dimensional navigation is used to simplify navigation steps between folded contents, and the user may set the level of the accelerated three-dimensional navigation.
(5) The settings are saved and the functions are enabled.

The main functions of the sensor information integration module include the following:
(1) Available sensor data sources and simulation data sources are enumerated according to the request of the user configuration module. The cross-system sensor information sharing mechanism and system simulation belong to external module technologies, and will not be described in the disclosure.
(2) The data source is monitored, and the data is adapted and converted into a unified navigation data output format. When the input of the data source is a simple state, for example, a static direction sign or static gesture identified by a camera, a simple key input and an analog key input, the output is a corresponding direction (a direction type, a direction value). It means to perform one navigation operation in this direction to move one step length or move to the next element of interest in this direction. When the input source information contains speed change data, such as a movement track of a mouse, a camera or other sensor identification bodies, the input contains step length information, and the output is a vector type, a direction value, and a moving distance. When the input source information is a specific instruction, such as an instruction to jump to a certain element or search for elements of keywords, and when the input source information is a specific gesture or voice and a specified function triggered by a function key, such as a function of directly jumping back to a header or expanding a folded page, the output is an instruction type, an instruction value, and an instruction parameter.
(3) The converted data is queued and is sent to the navigation path planning module at a preset rate, or the data is discarded.
(4) The system state is monitored, and when the change of the data source or a new data source is discovered, the user is notified to adjust the configuration.

The navigation path planning module generates a navigation command for describing a destination required for this navigation after receiving the input of the sensor information integration data module.

The navigation command execution module determines whether the current navigation is cursor navigation or focus navigation.

(1) If it is the cursor navigation, the navigation command execution module obtains the current position of the cursor, and then processes the input of the sensor information integration data module.

If an input of direction type is received and no model of interest is configured, a target position is calculated according to the current position of the cursor and the default step length. If the target position exceeds the boundary of a viewport, the target position is truncated at the boundary of the viewport, and the position is sent to the navigation command execution module.

If the input of direction type is received and a model of interest is configured, then a node tree corresponding to the model of interest is first obtained from a content analysis module. The node tree is traversed by taking the current point as a starting point, and a nearest node is searched for in the target direction according to a space navigation algorithm. If the nearest node is found, the target position is calculated through the target node; if any node is found in the target direction, the target position is calculated according to the current position of the cursor and the default step length. If the target position exceeds the boundary of the viewport, the target position is truncated at the boundary of the viewport, and the position is sent to the navigation command execution module.

If an input of vector type is received, regardless of whether a model of interest is configured, a target position is calculated according to the current position of the cursor and the vector information. If the target position exceeds the boundary of the viewport, the target position is truncated at the boundary of the viewport, and the position is sent to the navigation command execution module.

If an input of instruction type is received, an instruction list is queried, and the calculation related to the corresponding instruction is triggered.

(2) If it is the focus navigation, the content analysis sub-module obtains a position of the current focus element, and then processes the input of the sensor information integration data module.

If an input of direction type is received and no model of interest is configured, the points of interest are set as interactive elements, and then the next operation is performed.

If the input of direction type is received and a model of interest is configured, then a node tree corresponding to the model of interest is first obtained from the content analysis module. The node tree is traversed by taking the current focus element as a starting point, and a nearest node is searched for in the target direction according to a space navigation algorithm. If the nearest node is found, the target node is sent to the navigation command execution module. If any node is not found in the target direction, the current focus cannot be moved.

If an input of vector type is received, the vector information is ignored, and the processing is the same as that used for the input of direction type.

If an input of instruction type is received, an instruction list is queried, and the calculation related to the corresponding instruction is triggered.

At present, almost all operating system platforms support obtaining and setting a position of the cursor, and also provide accessibility system interfaces for content (e.g., Microsoft Active Accessibility/Interface Accessible (MSAA/IAccessible), UIAExpress and IAccessible2 of Windows, NSAccessibility of Mac OS X, assistive technology-service provider interface (AT-SPI) of Linux, Accessibility framework of Android, UIAccessibility of iOS, etc.). A navigation command based on cursor navigation may be executed through the system interface set for the cursor, and a focus may be reversely set for the content element through the accessibility system interface, thereby executing the focus-based navigation command.

The main functions of the navigation command execution module include the following:

(1) A platform top window is obtained as a target context.
(2) It is queried whether an interface for the cursor is set in the target context. If yes, it is indicated that the navigation is based on the cursor, otherwise, it is indicated that the navigation is based on the focus.
(3) The accessibility interface provided by the platform system is registered, changes in the content of a top-layer application are queried and responded, an accessible node tree is constructed, and interaction with the node tree is prepared.
(4) After the input of the navigation path planning module is received, if the navigation is based on the cursor, the interface set for the cursor by the platform is called, and the cursor is set to the target position. If the navigation is based on the focus, a corresponding node on the accessible node tree is found by matching the incoming element, and a focus setting event is sent through the node. The focus setting event notifies an application framework through the accessible interface of the platform of completing the operation of setting the focus, and the application framework reports the focus setting event through a javascript (JS) engine, thereby achieving the synchronization of higher-layer APP logics.

The main functions of the content analysis sub-module include the following:

(1) First, based on the accessible node tree constructed by the navigation command execution module, a target type content node subtree is constructed through filtering the model of interest, and is updated synchronously with the accessible node tree at any time.
(2) When the accessible node tree is incomplete and is difficult to obtain, the screen display content is periodically sampled through an external video and image analysis system (for example, a characteristic analysis system in FIG. 10), and an object of the screen display content is analyzed and extracted to assist in construction of a content node tree.
(3) A traversal interface for the content node tree is provided to provide node information for searching for a next focus according to the space navigation algorithm.

Function (2) is an optional function.

For the execution of special navigation instructions, the system may preset the special navigation instructions, and the user associates any external trigger mechanism such as voice or gestures with these preset navigation instructions to accelerate the movement of the focus or cursor.

When the navigation path planning module receives the special navigation instructions, an instruction flow is as follows:

(1) An instruction of returning to a header.

Operation 1: the accessible node tree is traversed in the root direction from the current focus element, to find a first node whose role is a header type as a target node. Operation 2: if the current context is cursor-based navigation, a position of the node is queried, and the position is sent to the navigation command execution module. Operation 3: if the current context is focus-based navigation, the target node is directly sent to the navigation command execution module.

(2) An instruction of expanding table elements at the same level and performing fast three-dimensional navigation.

Operation 1: the current position of the focus is queried, the identifier of a header node of the classification panel where the current position of the focus is located is queried, the current position of the focus and the identifier of the header node of the classification panel are cached in a stack (TAB ID, START_POSITION), and a thumbnail of the classification panel is cut and cached (TAB_ID_SNAPSHOT). Operation 2: header nodes of all other classification panels at the same level as the current classification panel are traversed one by one, a focus is set for a header node, a click or confirmation event is sent to trigger the display of the classification panel, and a thumbnail of the classification panel is cut and cached. If the user sends a confirmation message at this time, it is indicated that the user desires to navigate to the current panel, and then the traversal of the panels is stopped. When the traversal of classification panels at the same level is completed but the user has not sent a confirmation signal, operation 3 is performed. Operation 3: the thumbnails of the classification panels are displayed in a cascading and rotating manner, until the user sends a signal to confirm the selection of a certain classification panel or an exit signal. For the selection confirmation signal, the user is navigated to a table corresponding to the current thumbnail, the focus is set to an element corresponding to the START_POSITION of the classification panel, and then the three-dimensional navigation mode is exited. For the exit signal, the three-dimensional navigation mode is exited, and the focus is set back to the corresponding position of the classification table when the three-dimensional navigation mode is entered. Operation 4: after the three-dimensional navigation is performed on the same level of classification panels for the first time, the header nodes and corresponding thumbnails of the classification panels have been cached. Afterwards, when a three-dimensional navigation command request is received again, the cached thumbnails of the classification panels are directly displayed in a cascading and rotating manner for the user to choose, which is the same as operation 3.

In addition, the optimization process for the dense operation area (such as but not limited to the input method panel) in an embodiment of the disclosure includes the following:

Operation 1: when the user enables this optimization method or detects that a dense panel appears at the top-layer of an application, marks of candidate focus are first drawn on the screen. The drawing may include but is not limited to: the candidate focuses are represented by dotted boxes or dotted cursors, and the current active focus is represented by a solid box. One candidate focus or a plurality of candidate focuses may be specified according to the presetting or user configuration. A method for selecting an initial position of the candidate focus includes: (1) According to a user's click history on the page or panel, the initial position of the candidate focus is set as a position that the user recently clicked on the page or panel; or (2) according to a number of candidate focuses, the candidate focuses are discretely (evenly or unevenly) placed on a plurality of areas of the page or panel. An array of candidate focuses is initialized, and state information of each candidate focus is recorded, such as identity (ID), whether it is active, or a position (and its corresponding accessible node).

Operation 2: the movement of the actual focus element on the panel of the application is monitored through the accessible node tree of the navigation command execution module, the position of the current active focus (and its corresponding accessible node information) is updated, and the drawing of the navigation mark (solid box) is updated. Operation 3: when a candidate focus switching command is received, a target candidate focus is queried in the array of candidate focuses and is set as a new active focus. If the current active focus has moved before, the navigation command execution module sends a confirmation signal to the current element to trigger the input. The state of the current active focus is set to be inactive, and the mark drawn on the panel is updated as the mark of a candidate focus (e.g., a dotted box). The state of the new candidate focus is updated to be active, and the mark of the new candidate focus drawn on the panel is updated as the mark of the active focus (e.g., a solid box). The navigation command execution module sets the node element corresponding to the new active focus element as a focus element for the application.

Based on the above description, an embodiment of the disclosure further provides an electronic device.

Figure 11:
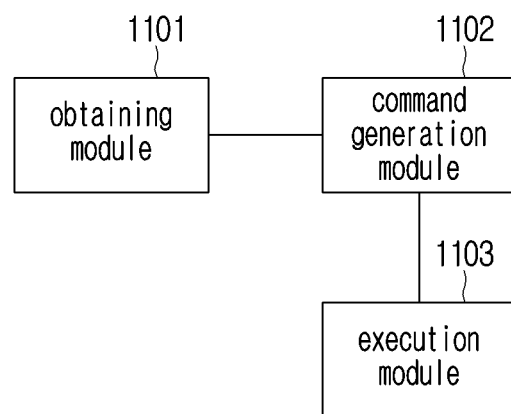
FIG. 11 is a structural diagram of an electronic device according to an embodiment of the disclosure.

FIG. 11 is a structural diagram of a page navigation device according to an embodiment of the disclosure.

Referring to FIG. 11, the electronic device includes: an obtaining module 1101, configured to obtain first navigation information from a first information source, and obtain second navigation information from a second information source, a command generation module 1102, configured to generate a first page navigation command based on the first navigation information, and generate a second page navigation command based on the second navigation information, and an execution module 1103, configured to execute the first page navigation command and the second page navigation command.

In an embodiment, the first information source includes at least one of a mouse, a keyboard, or a remote control, and the second information source includes at least one of a voice microphone, a two-dimensional camera, a three-dimensional camera, an infrared camera, a motion sensor, a posture sensor, a wearable device, a shared sensor information source on a remote mobile device, an analog data generator, or an analog remote control.

In an embodiment, the execution module 1103 is further configured to execute the second page navigation command to move a focus on a page according to a second movement speed, and execute the first page navigation command to move the focus on the page according to a first movement speed. The second movement speed is greater than the first movement speed.

In an embodiment, the command generation module 1102 is further configured to parse the page to determine points of interest, and generate the second page navigation command for controlling the focus to jump between the points of interest, based on the second navigation information. Preferably, the points of interest include interactive elements or non-interactive elements.

In an embodiment, the command generation module 1102 is further configured to parse a tiled page containing a plurality of TAB tables to generate a cascading state table containing the plurality of TAB tables, and generate the second page navigation command for displaying the cascading state table. The execution module 1103 is further configured to execute the second page navigation command to display the cascading state table, and execute the first page navigation command to traverse the focus between the TAB tables of the cascading state table.

In an embodiment, the execution module 1103 is further configured to execute at least one of displaying the cascading state table in a rotating display mode, displaying the cascading state table in a tiled display mode, or displaying the cascading state table in a tree display mode.

In an embodiment, the execution module 1103 is further configured to execute the second page navigation command to switch a predetermined candidate focus on the page to an active focus, and execute the first page navigation command to move the focus on the page from a position of the active focus.

In an embodiment, the execution module 1103 is further configured to set, according to a user's click history on the page or panel, the initial position of the candidate focus as a position that the user recently clicked on the page or panel, or, discretely place, according to the number of candidate focuses, the candidate focuses on a plurality of areas of the page or panel. The process of discretely placing the candidate focuses on the plurality of areas of the page or panel may be implemented as discretely placing the candidate focuses on the plurality of areas of the page or panel evenly, or discretely placing the candidate focuses on the plurality of areas of the page or panel unevenly.

Based on the above, embodiments of the disclosure provide an in-page navigation solution for triggering a cursor or focus to move through the cooperative operation of multi-input devices. A global auxiliary navigation layer is introduced to separate the input of the existing navigation signals from the input of other navigation signals. The auxiliary navigation signals use an independent navigation rule, so that resources do not conflict and a running basis for the cooperative operation of multiple devices may be provided. Moreover, by using the independent rule, the auxiliary navigation layer may be smoothly enabled and exited, as described in the fourth embodiment and the fifth embodiment. The user does not need to interrupt the current navigation to enable the new function, and the new navigation function is almost parallel to the existing navigation function. Further, the navigation rule of the auxiliary navigation layer may be complicated or simple, and a purpose is to customize operations that cannot be done independently by the existing navigation modes. Furthermore, the embodiments of the disclosure provide three-dimensional accelerated navigation based on the expansion of closed panels in a page and accelerated navigation based on candidate focus switching for a dense operation area. In addition, the three-dimensional accelerated navigation based on the expansion of closed panels uses a space-for-time method, which provides user choices by caching the expanded content to reduce the user's click operations. The accelerated navigation based on candidate focus switching for a dense operation area is described by taking an input method panel as an example. In order to increase the parallelism of operations, a new signal is used to trigger the focus to jump, which reduces key operations on the frequently repeated operation path. A difficulty in the implementation of the global auxiliary navigation layer is to interact with the currently presented content through a compatible method to move the focus.

An embodiment of the disclosure further provides an electronic device with a memory-processor structure.

Figure 12:
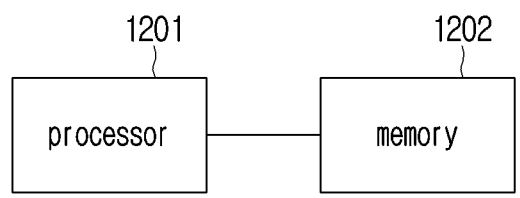
FIG. 12 is a structural diagram of an electronic device with a memory-processor structure according to an embodiment of the disclosure.

FIG. 12 is a structural diagram of an electronic device with a memory-processor structure according to the disclosure.

Referring to FIG. 12, an electronic device with a memory-processor structure includes a processor 1201 and a memory 1202. The memory 1202 stores an application program executable by the processor 1201, which causes the processor 1201 to execute the above methods for the electronic device.

The memory 1202 may be specifically implemented as various storage media such as an electrically erasable programmable read-only memory (EEPROM), a flash memory, or a programmable read-only memory (PROM). The processor 1201 may be implemented to include one or more central processing units or one or more field programmable gate arrays (FPGAs). The field programmable gate array integrates one or more central processing unit cores. Specifically, the central processing unit or central processing unit core may be implemented as a central processing unit (CPU) or microcontroller unit (MCU).

In an embodiment according to the disclosure, the processor is configured to obtain first navigation information from a first information source and obtain second navigation information from a second information source, generate a first page navigation command based on the first navigation information and generate a second page navigation command based on the second navigation information, and execute the first page navigation command and the second page navigation command.

The first information source comprises at least one of a mouse, a keyboard, or a remote control, and the second information source comprises at least one of a voice microphone, a two-dimensional camera, a three-dimensional camera, an infrared camera, a motion sensor; a posture sensor, a wearable device, a shared sensor information source on a remote mobile device, an analog data generator, or an analog remote control.

In an embodiment according to the disclosure, the processor is configured to execute the second page navigation command to move a focus in a page according to a second movement speed, and execute the first page navigation command to move the focus in the page according to a first movement speed. The second movement speed is greater than the first movement speed.

In an embodiment according to the disclosure, the processor is configured to parse a page to determine points of interest, and generate the second page navigation command for controlling a focus to jump between the points of interest, based on the second navigation information.

The points of interest comprise interactive elements or non-interactive elements.

In an embodiment according to the disclosure, the processor is configured to parse a tiled page containing a plurality of TAB tables to generate a cascading state table containing the plurality of TAB tables, and generate the second page navigation command for displaying the cascading state table. The processor is further configured to execute the second page navigation command to display the cascading state table, and execute the first page navigation command to traverse a focus between the TAB tables of the cascading state table.

In an embodiment according to the disclosure, the processor is configured to display the cascading state table in at least one display mode among a rotating display mode, a tiled display mode, or a tree display mode.

In an embodiment according to the disclosure, the processor is configured to execute the second page navigation command to switch a predetermined candidate focus in a page to an active focus, and execute the first page navigation command to move a focus in the page from a position of the active focus.

In an embodiment according to the disclosure, the processor is configured to set an initial position of the candidate focus as a position that a user recently clicked on a page or panel, according to a user's click history on the page or panel, or discretely place candidate focuses on a plurality of areas of the page or panel according to a number of candidate focuses.

In the embodiments of the disclosure, the first navigation information is obtained from the first information source and the second navigation information is obtained from the second information source, the first page navigation command is generated based on the first navigation information and the second page navigation command is generated based on the second navigation information, and the first page navigation command and the second page navigation command are executed. It can be seen that in the embodiments of the disclosure, the navigation information is obtained from a plurality of information sources, and the navigation may be implemented separately based on a plurality of page navigation commands, thereby improving navigation efficiency.

Moreover, the focus may be moved quickly by executing the second page navigation command, and the focus may be accurately adjusted by executing the first page navigation command.

In addition, the shuttle time may be significantly reduced through three-dimensional navigation in a cascading state. Through the cooperation of the first page navigation command and the second page navigation command, the focus may be quickly moved based on focus switching, which may significantly reduce the number of keystrokes.

According to another embodiment, the processor 1201 may control the display (not illustrated) to display a plurality of candidate focuses on the screen, switch one of the plurality of candidate focuses to an active focus according to a first user input, and control the display to move the switched active focus according to a second user input. Here, the focus may be one of a cursor or a focus box.

In this case, the first user input may be received through a first information source, and the second user input may be received through a second information source. For example, the first information source comprises at least one of a voice microphone, a two-dimensional camera, a three-dimensional camera, an infrared camera, a motion sensor, a posture sensor, a wearable device, a shared sensor information source on a remote mobile device, an analog data generator, or an analog remote control. The second information source comprises at least one of a mouse, a keyboard, or a remote control. In particular, the processor may set an initial position of the predetermined candidate focus as a position that a user recently clicked on the screen, according to a user's click history on the screen.

In addition, the processor is configured such that the plurality of candidate focuses are discretely placed on a plurality of areas of the screen according to a number of candidate focuses.

Figure 8A:
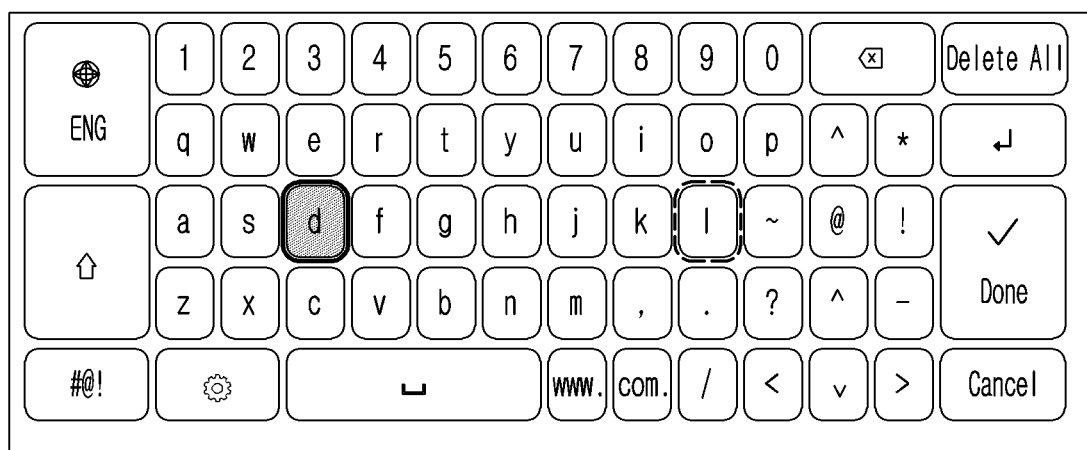
FIGS. 8A, 8B, 8C, 8D and 8E are diagrams of reducing the number of keystrokes in a dense operation area via a multi-input cooperative operation according to various embodiments of the disclosure.
Figure 8B:
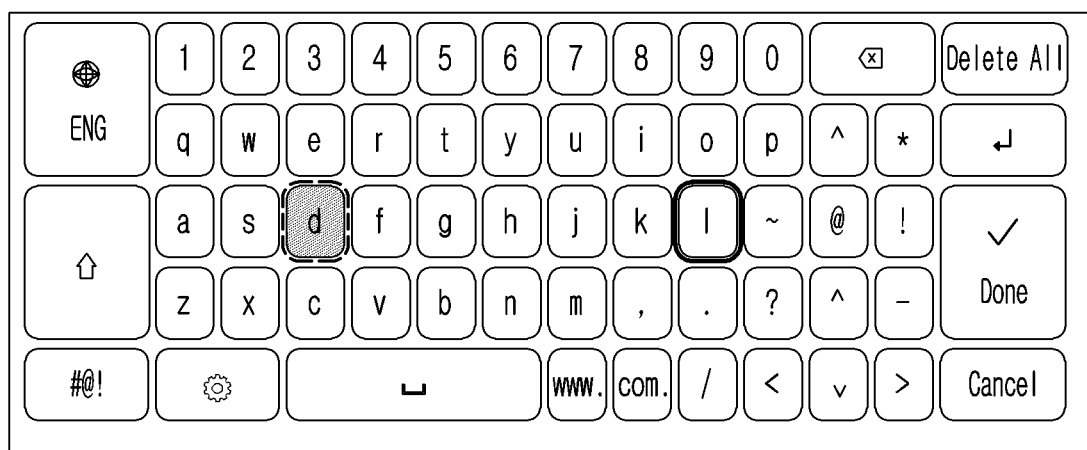
Figure 8C:
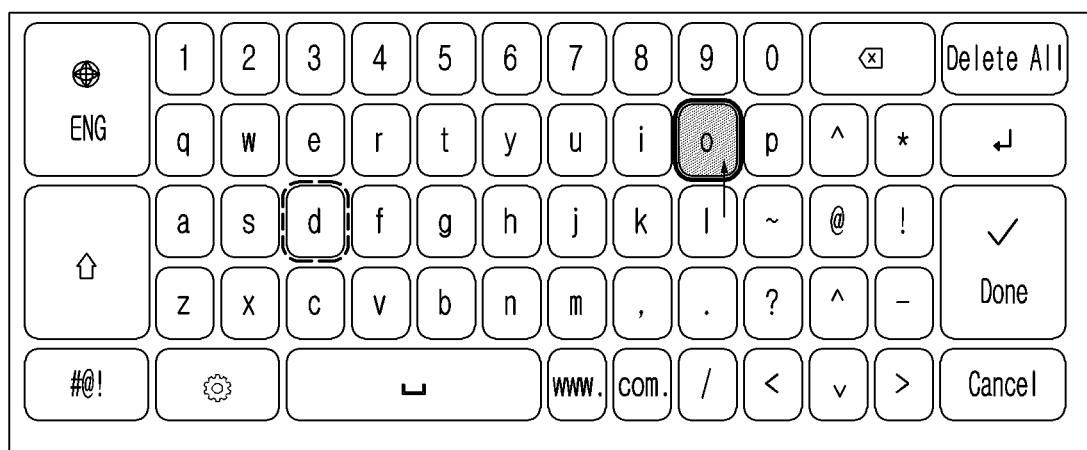
Figure 8D:
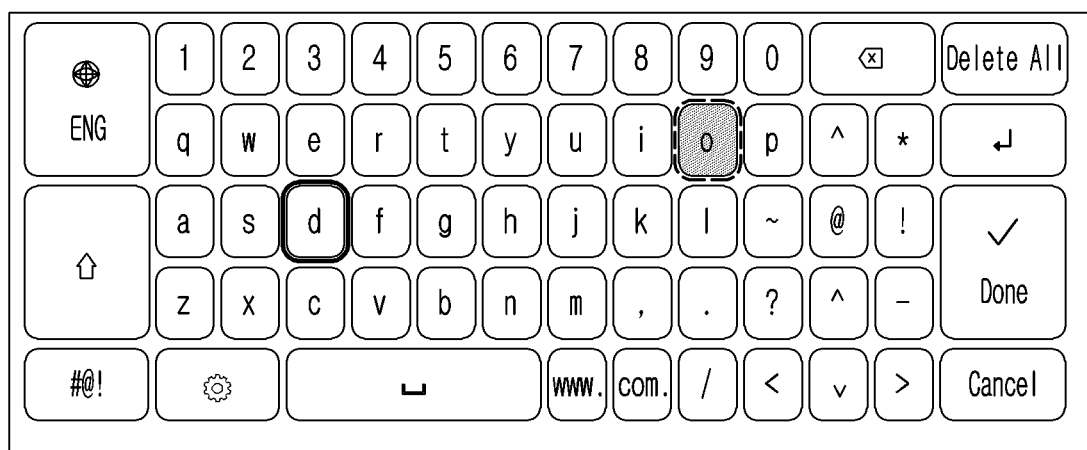
Figure 8E:
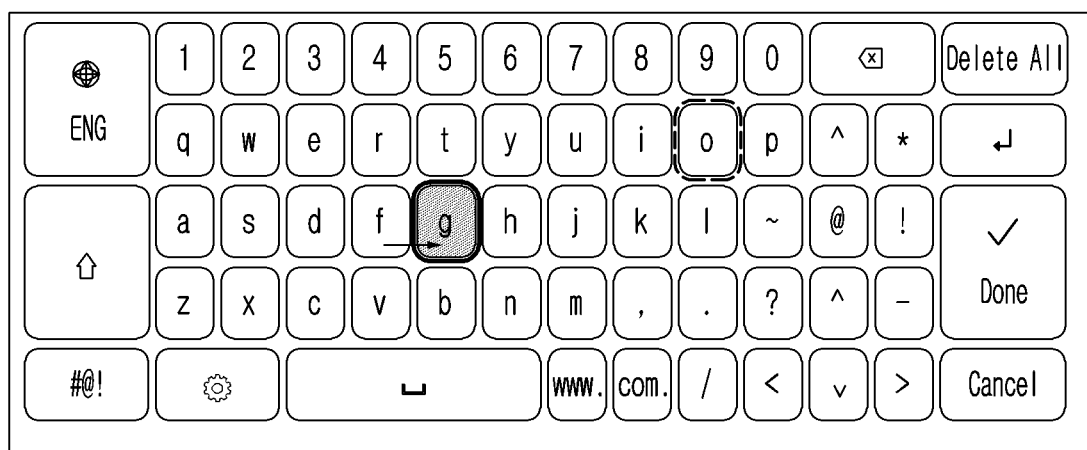

In this case, the screen may include a keyboard UI including UI elements corresponding to a plurality of characters, and the plurality of candidate focuses may be displayed on elements corresponding to at least two or more characters from among the plurality of characters. For example, as illustrated in FIG. 8A, the plurality of candidate focuses may be displayed on elements corresponding to the characters on the keyboard. In addition, when one of the plurality of candidate focuses is switched to an active focus, the processor 1201 may control the display to display the switched active focus distinctively from the candidate focuses.

In this case, the screen may include a keyboard UI including UI elements corresponding to a plurality of characters, and the plurality of candidate focuses may be displayed on elements corresponding to at least two or more characters from among the plurality of characters. For example, as illustrated in FIG. 8A, the plurality of candidate focuses may be displayed on elements corresponding to the characters on the keyboard.

In addition, when one of the plurality of candidate focuses is switched to an active focus, the processor 1201 may control the display to display the switched active focus distinctively from the candidate focuses.

It should be noted that not all operations and modules in the above processes and structural diagrams are necessary, and some operations or modules may be omitted according to actual requirements. The execution sequence of each operation is not constant, but may be adjusted as required. The division of each module is only for the convenience of describing the used functions. During actual implementation, one module may be implemented as a plurality of modules, and the functions of a plurality of modules may also be implemented by the same module. These modules may be located in the same device or in different devices.

The hardware modules in each embodiment may be implemented with a mechanical or electronic manner. For example, a hardware module may include specially designed permanent circuits or logic devices (for example, dedicated processors, such as FPGAs or application-specific integrated circuits (ASICs)) to complete a specific operation. The hardware module may also include programmable logic devices or circuits temporarily configured by software (for example, general-purpose processors or other programmable processors) to perform a specific operation. It may be determined according to costs and time considerations whether to use the mechanical manner, or the dedicated permanent circuit, or the temporarily configured circuit (for example, configured by software) to implement the hardware module.

The disclosure further provides a machine-readable storage medium, which stores instructions for causing a machine to perform the method of the application. Specifically, a system or device equipped with a storage medium may be provided. The storage medium stores software program codes for realizing the functions of any one of the above embodiments, and a computer (or CPU or MPU) of the system or the device may read and execute the program codes stored in the storage medium. In addition, part or all of the actual operations may be completed by an operating system and the like running on the computer through the instructions based on the program codes. The program codes read from the storage medium may also be written into a memory configured in an expansion board inserted into the computer or written into a memory configured in an expansion unit connected to the computer, and then part or all of the actual operations are executed by a CPU and the like installed on the expansion board or the expansion unit through the instructions based on the program codes, thereby realizing the functions of any one of the above embodiments.

In embodiments, the storage medium for providing the program codes may include a floppy disk, a hard disk, a magneto-optical disk, an optical disk (e.g., compact disc read only memory (CD-ROM), compact disc-recordable (CD-R), compact disc-rewritable (CD-RW), digital versatile disc-read only memory (DVD-ROM), digital versatile disc-random access memory (DVD-RAM), digital versatile disc-rewritable (DVD-RW or DVD+RW)), a magnetic tape, a non-transitory memory card and an ROM. Optionally, the program codes may be downloaded from a server computer or a cloud via a communication network.

The term "exemplary" means "serving as an example, instance or description," and illustrations and embodiments described as "exemplary" should not be interpreted as a more preferred or more advantageous technical solution. For the purpose of conciseness of drawings, each figure only schematically shows the part related to the disclosure, but does not represent the actual structure of a product. Moreover, in order to make the drawings concise and easy to understand, in some drawings, only one of components with the same structure or function is schematically shown, or only one of them is marked. Herein, "one" does not mean that the number of relevant parts of the disclosure is limited to "only one," and "one" also does not mean to exclude the situation where the number of relevant parts of the disclosure is "more than one." Herein, "upper," "lower," "front," "rear," "left," "right," "inner," "outer," etc., are only used to indicate the relative position relationship between relevant parts, but are not used to limit the absolute positions of the relevant parts.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A page navigation method, comprising:
   displaying an active focus on a first user interface (UI) element and a first candidate focus on a second UI element on a screen;
   receiving, through a user input source, a first user input for switching the first candidate focus to the active focus;
   switching, according to the first user input, the first candidate focus to the active focus by removing the active focus from the first UI element, removing the first candidate focus from the second UI element, displaying the active focus on the second UI element, and displaying a second candidate focus on the first UI element;
   receiving, through the user input source, a second user input for moving the active focus; and
   moving, according to the second user input, the active focus by removing the active focus from the second UI element and displaying the active focus on a third UI element.

2. The method of claim 1, further comprising:
   receiving, through the user input source, a third user input for switching the active focus to the second candidate focus;
   switching, according to the third user input, the active focus to the second candidate focus by removing the active focus from the third UI element, and displaying the active focus on the first UI element; and transforming the third UI element into a third candidate focus by removing the active focus from the third UI element and displaying the third candidate focus on the third UI element.

3. The method of claim 2, wherein the first user input and the third user input is a user input of an instruction type, and the second user input is a user input of a direction type,
   wherein the user input of the instruction type is a user input for switching between the active focus and a candidate focus, and
   wherein the user input of the direction type is a user input for maintaining the candidate focus, and moving the active focus in any one direction from among four directions.

4. The method of claim 1, further comprising: setting an initial position of the first candidate focus as a position that a user recently clicked on the screen, according to a user's click history on the screen.

5. The method of claim 1, wherein the screen includes a keyboard user interface (UI) including UI elements corresponding to a plurality of characters.

6. The method of claim 5, wherein the first candidate focus is displayed on the second UI element corresponding to one of the plurality of characters.

7. The method of claim 1, wherein the active focus is a focus box.

8. The method of claim 1, wherein the active focus is displayed distinctively from the second candidate focus.

9. The method of claim 1, wherein the user input source is a remote controller for controlling an electronic device that displays the screen including the first UI element, the second UI element, and the third UI element.

10. An electronic device, comprising:
    a display;
    a memory; and
    a processor configured to execute at least one instruction stored in the memory to control the electronic device,
    wherein the processor is further configured to:
    control the display to display an active focus on a first user interface (UI) element and a first candidate focus on a second UI element on a screen,
    receive, through a user input source, a first user input for switching the first candidate focus to the active focus,
    switch, according to the first user input, the first candidate focus to the active focus by removing the active focus from the first UI element, removing the first candidate focus from the second UI element, displaying the active focus on the second UI element, and display a second candidate focus on the first UI element,
    receive, through the user input source, a second user input for moving the active focus, and
    move, according to the second user input, the active focus by removing the active focus from the second UI element and display the active focus on a third UI element.

11. The electronic device of claim 10, wherein the processor is further configured to:
    receive, through the user input source, a third user input for switching the active focus to the second candidate focus, and
    switch, according to the third user input, the active focus to the second candidate focus by removing the active focus from the third UI element, and displaying the active focus on the first UI element; and transforming the third UI element into a third candidate focus by removing the active focus from the third UI element and displaying the third candidate focus on the third UI element.

12. The electronic device of claim 11,
    wherein each of the first user input and the third user input is a user input of an instruction type, and the second user input is a user input of a direction type,
    wherein the user input of the instruction type is an user input for switching between the active focus and a candidate focus, and wherein the user input of the direction type is an user input for maintaining the candidate focus, and moving the active focus in any one direction from among four directions.

13. The electronic device of claim 10, wherein the processor is further configured to:
set an initial position of the first candidate focus as a position that a user recently clicked on the screen, according to a user's click history on the screen.

14. The electronic device of claim 10, wherein the screen includes a keyboard user interface (UI) including UI elements corresponding to a plurality of characters.

15. The electronic device of claim 14, wherein the first candidate focus is displayed on the second UI element corresponding to one of the plurality of characters.

16. The electronic device of claim 10, wherein the active focus is a focus box.

17. The electronic device of claim 10, wherein the active focus is displayed distinctively from the second candidate focus.

18. A non-transitory computer-readable recording medium having recorded thereon instructions, which when executed by a processor, cause an electronic device to perform operations comprising:
displaying an active focus on a first user interface (UI) element and a first candidate focus on a second UI element on a screen;
receiving, through a user input source, a first user input of an instruction type for switching the first candidate focus to the active focus;
switching, according to the first user input, the first candidate focus to the active focus by removing the active focus from the first UI element, removing the first candidate focus from the second UI element, displaying the active focus on the second UI element, and displaying a second candidate focus on the first UI element;
receiving, through the user input source, a second user input of a direction type for moving the active focus; and
moving, according to the second user input, the active focus by removing the active focus from the second UI element and displaying the active focus on a third UI element.

* * * * *